April 8, 1958 J. A. WRIGHT 2,829,861
ELECTROMAGNETIC VALVE
Filed Feb. 9, 1955 2 Sheets-Sheet 1
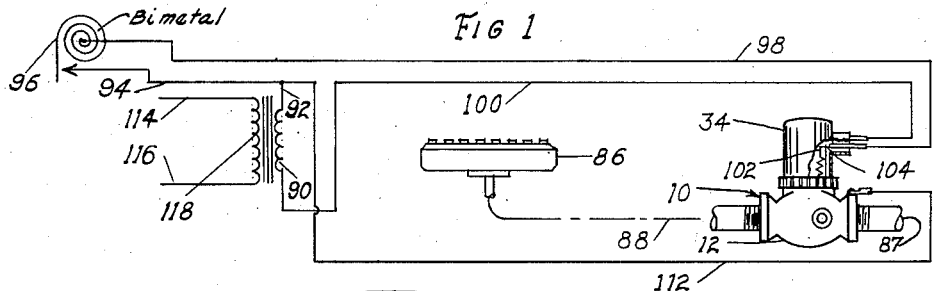
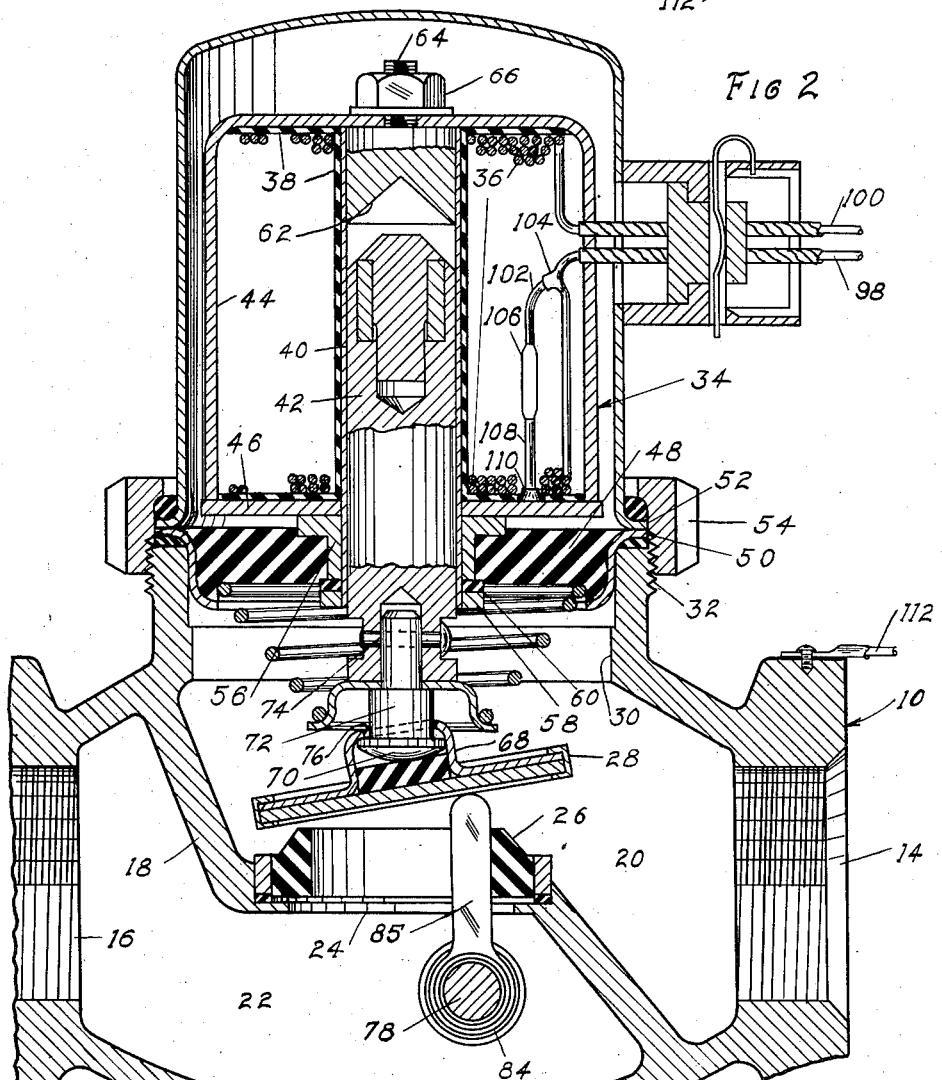
INVENTOR
JAMES A. WRIGHT
BY Charles E. Markham
HIS AGENT April 8, 1958  J. A. WRIGHT  2,829,861
ELECTROMAGNETIC VALVE
Filed Feb. 9, 1955  2 Sheets-Sheet 2

INVENTOR
JAMES A. WRIGHT
BY *Charles E. Markham*
HIS AGENT

United States Patent Office 2,829,861
Patented Apr. 8, 1958

2,829,861

ELECTROMAGNETIC VALVE

James A. Wright, Webster Groves, Mo., assignor, by mesne assignments, to White-Rodgers Company, a corporation of Delaware Application February 9, 1955, Serial No. 487,030

4 Claims. (Cl. 251—130)

This invention relates generally to electromagnetically operated fuel supply valves, and more particularly to the combination with such valves of means for manually operating the valve in event of electrical power failure and for automatically returning the valve to electrical operation upon the restoration of electrical power.

In heating systems employing an electromagnetically operated valve to control the flow of fuel to the furnace, the valve is normally biased in a closed position and opens to admit fuel to the furnace when the room thermostat closes to complete an energizing circuit for the valve. When sufficient heat is delivered to the space, the thermostat opens, breaking the valve energizing circuit, and the valve closes. The space thermostat thereafter remains open until the space temperature drops below a predetermined point.

In order that heat may be supplied to the space in the event of a temporary failure of the electrical power supply for operation of the valve, a manual operator is conventionally provided for manually opening the valve and for holding or latching it open. Such manual operator is usually constructed so as to be capable of only partially opening the valve and is also arranged so as to interlock in some manner with the biased valve so that the valve is held partially open and so that the manual operator is held in a position by the valve to keep the valve partially open. This arrangement, in which the manual valve operator and the valve are mutually latched, is also usually such that, when power is restored, the electromagnetic actuator moves the valve further open, to its full open position, thereby releasing this mutual latch-up, and the valve and the manual operator each return to their respective biased positions.

It so happens, however, that if the fuel valve is manually opened, and held open for any appreciable period during a cessation in eletcrical power supply, the space will be in a heated condition when power supply is restored, and the space thermostat will, consequently, be in a satisfied, open position with no inclination to close and energize the electromagnet so that the valve and manual operator latch-up will be tripped. The valve would, therefore, remain open indefinitely until it was manually closed. To overcome this condition, a shunt around the controlling space thermostat is needed so that, upon restoration of electrical power, the valve actuator will be immediately energized regardless of the position of the space thermostat. This shunt must, of course, be inoperative at all other times except when the valve is being held open manually. This requirement calls for a control switch in this shunt which is positioned or operated by the manual operator.

The present invention has for an object the provision of a solenoid valve, including manual means for opening the valve when electrical power for its operation fails and wherein the valve is automatically restored to normal electrical operation and control upon the resumption of electrical power without the provision of additional switching means regardless of the position of the controlling room thermostat.

A further object is to provide a solenoid valve comprising a solenoid valve actuator, a valve body, a valve in the body, and a manual operator mounted on the valve body for manually operating the valve, wherein the solenoid valve actuator and valve are electrically insulated from the valve body and wherein the manual operator upon contacting the valve completes a shunt circuit around the room thermostat extending from the valve actuator through the valve body for the energization of the valve actuator, thereby obviating the necessity of providing a switch.

These and other objects and advantages will appear from the following description when read in connection with the accompanying drawings.

In the drawings:

Fig. 1 is a schematic view illustrating one form of the present invention;

Fig. 2 is an enlarged sectional view of the solenoid valve shown in Fig. 1. In this view the valve is shown in de-energized position with the valve held partially open by the manual operating means;

Figure 3:
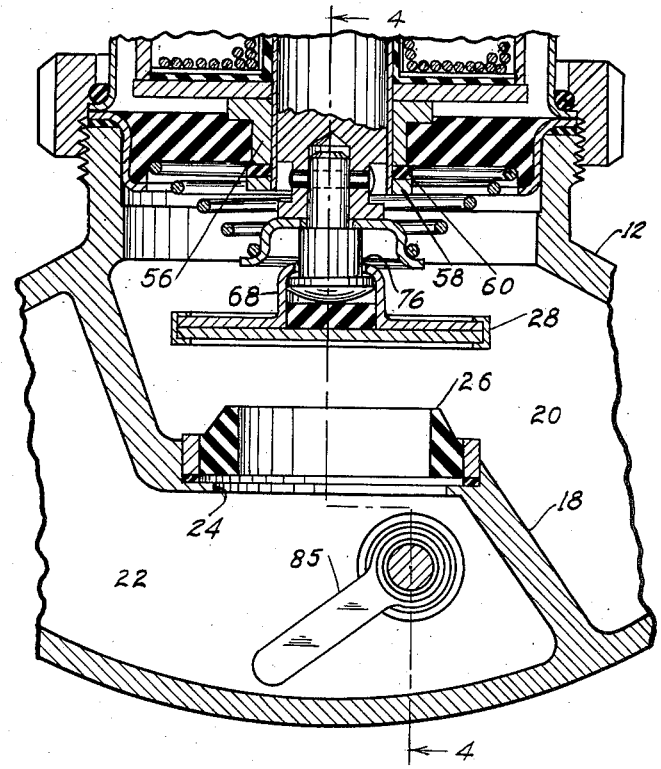
Fig. 3 is an enlarged fragmentary section of the valve shown in Fig. 1. In this view, the valve is shown in a full, open, energized position.

Referring to the drawings, numeral 10 generally indicates a solenoid gas valve having a metal body member 12 provided with an inlet 14, an outlet 16, and a partition 18 which divides the valve body into inlet and outlet sections 20 and 22 respectively. A port 24 in the partition 18 is fitted with an annular valve seat 26 of dielectric material so as to electrically insulate the metal valve 28 from the metal valve body 12 when the valve is on its seat in a closed position, and the seat is preferably constructed of a pliable, dielectric material so as to also be sound absorbing.

The upper part of the valve body 12 is provided with an opening 30 concentric with valve seat 26 and a short, externally threaded, cylindrical extension 32 on which a solenoid actuator generally indicated at 34 is mounted. The solenoid actuator 34 comprises a winding, shown in part at 36, wound on an insulating spool 38, a central, plunger guide sleeve 40 of conducting but non-magnetic material, a plunger 42 of magnetic material loosely fitted in the guide sleeve, and an enclosure forming a flux path and comprising an inverted, flanged, cup member 44 and a plate 46, both of magnetic material.

The solenoid actuator is supported on a pliable disc 48 of dielectric material and preferably of a semi-soft material such as synthetic rubber which will also serve to absorb operational noises. The disc 48 is provided with a peripheral flange 50 which, together with the flanged rim 52 of cup 44, is clamped to the end of the cylindrical body boss 32 by a nut 54. The disc 48 is also provided with a central metal bushing 56 through which the plunger guide sleeve 40 extends.

The guide sleeve 40 is provided with a flange 58 on the lower end thereof which abuts the lower end of central bushing 56 through a pliable washer 60, and the upper end of the guide sleeve is provided with an internal plunger stop member having an upwardly extending stud portion 64 which extends through a hole in the bottom of cup 44. The flange 58 and the stop member 62 are rigidly fixed to the guide sleeve so that, when a nut 66 is threaded on stud 64 and tightened against cup 44, the entire solenoid assembly is firmly connected and firmly attached to the central portion of the pliable disc 48.

The lower end of plunger 42 loosely carries the metal valve 28 in a manner to permit it to universally swivel thereon within limits. The hollow, upper, boss portion 68 of the valve loosely receives the head 70 on a valve stem 72, which stem is received in the lower end of the solenoid plunger and is anchored therein by a pin 74. The valve stem 72 passes freely through a hole 76 in the boss 68. As the valve 28 is tilted on its stem, a definite metal-to-metal contact is made between the valve boss 68 and the valve stem on one side or the other of the hole 76.

Below the valve seat in the outlet chamber 22, there is arranged a manual operator shaft 78 which extends internally and externally of the valve body 12 and is journalled in a hollow, threaded, metal plug 80 which is screw threaded in a wall of the valve body 12. The shaft is arranged perpendicular to the solenoid plunger and is offset horizontally from the longitudinal center line of the plunger as shown in Figs. 2 and 3. The shaft 78 is provided with a manual turning knob 82 at its external end, and a spring 84 normally urges the shaft rotationally in one direction. The internal end of the shaft 78 carries fixed thereon a metal arm 85 which, when the shaft 78 is rotated in the opposite direction against spring 84, swings upwardly through the port 24 and engages the under side of valve 28 to lift it from its seat 26.

Due to the fact that shaft 78 is offset horizontally from the center line of the plunger and valve, the valve will be tilted definitely in one direction as it is lifted from its seat by the arm 85. Thus, when arm 85 reaches a vertical position, it is restrained from returning by the weight of the valve and the plunger assembly, and a conducting path including a series of metal-to-metal contacts is completed between the valve body and the solenoid winding enclosure plate 46.

This conducting path comprises the valve body 12, the bushing 80, the shaft 78, the arm 85, the valve 28, valve stem 72, plunger 42, guide sleeve 40, and from guide sleeve 40 to plate 46 directly and via the bushing 56. It is to be understood that the loosely fitted plunger is pressed laterally against one wall of its sleeve 40 by the action of the manual operator arm 85 and that the fit of the guide sleeve 40 in the bushing 56 and through an opening in the plate 46 is sufficiently tight to provide adequate metal-to-metal contact to provide a suitable electrical conducting path for the purpose to be described.

Figure 4:
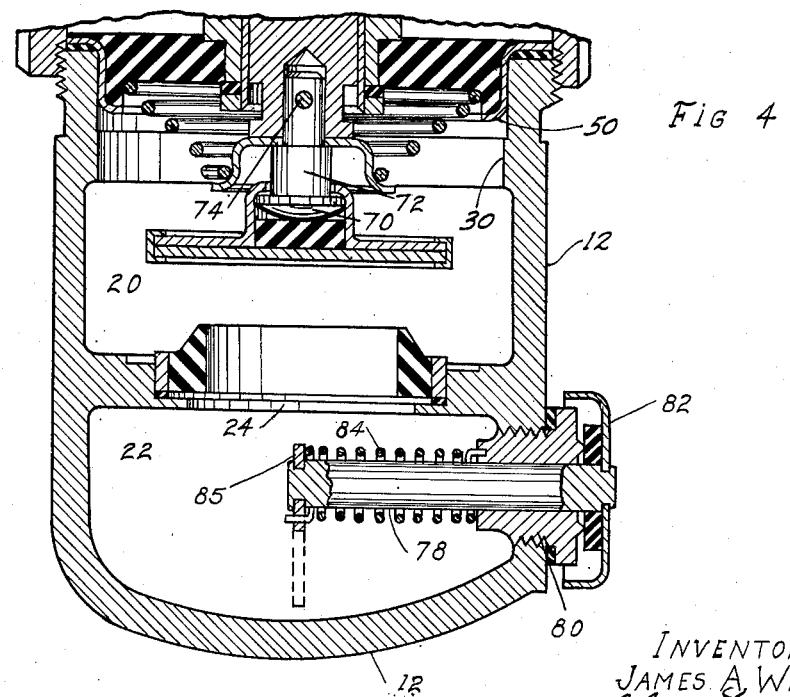
Fig. 4 is an enlarged fragmentary section of the valve taken on line 4—4 of Fig. 3.

In Figs. 3 and 4, the valve is shown in the full open position to which it is moved by the solenoid actuator. In this position, the upper end of the plunger 42 is resting against the metal stop member 62. The manual operator arm is of such length, however, that it does not raise the valve and plunger to this full open position, but raises it some lesser amount as indicated in Fig. 2.

In the schematic arrangement shown in Fig. 1, the valve 10 is arranged to control the supply of fuel to a burner 86, which fuel flows from a suitable source of supply through the fuel pipes 87 and 88. A first circuit for the normal intermittent energization of the valve in accordance with heating requirements is provided, and it comprises a transformer secondary winding 90, a lead 92 connected to one side of the secondary winding, a lead 94, a room thermostat 96, a lead 98 leading from the room thermostat and connected to one end of the solenoid winding 36, and a lead 100 connected to the other end of the winding 36 and leading back to the other side of the secondary winding 90.

A second, thermostat-shunting circuit for energizing the solenoid winding 36 when the valve is manually held open is also provided, and it comprises the secondary winding 90, the lead 100 connected to one side of the secondary 90 and to one side of the solenoid winding 36, a lead 102 connected to the other side of the solenoid winding 36 at 104, a resistor 106, a lead 108, the enclosure plate 46 to which the lead 108 is connected at 110 (see Fig. 2), the bushing 56, the plunger guide sleeve 40, the plunger 42, the valve stem 72, the valve 28, the manual operator arm 85, the shaft 78, the journal plug 80, the valve body 12 and a lead 112 from the valve body 12 to the other side of the transformer secondary 90. This circuit could, of course, be completed between the valve body 12 and transformer secondary 90 by grounding both of these elements. However, rather than risk the chance of failure to establish a definite ground, in installation practice, I prefer to use the lead 112 and connect it directly to the valve body and transformer secondary.

The resistor 106 has a purpose of limiting the current flow at the time of breaking the shunt circuit at the point of contact of operator arm 85 and valve 28 so as to prevent any arcing at this point. Electrical energy for operation of the device is supplied through leads 114 and 116 connected to a suitable commercial power source and to the opposite sides of the transformer primary winding 118.

In operation, when the supply of electrical energy is normal, the solenoid valve 10 is energized through the above-described first circuit and opens to supply fuel to the burner 86 when the thermostat 96 closes demanding heat. When sufficient heat has been supplied the thermostat opens, the valve is de-energized and closes, cutting off the supply of fuel.

In event the source of electrical energy fails for any reason and it is desired to supply heat to the space, the manual operator knob 82 is rotated in a direction to swing arm 85 upward and to open valve 28. When the arm 85 reaches a substantially vertical position, it will remain there, holding the valve in a partially open position. Under these conditions, if at any time electrical power is restored, the solenoid winding 36 will be energized through the above-described second shunting circuit regardless of the position of the thermostat. Upon thus energizing the winding 36, the plunger and valve are instantly moved upward to the full open position of the valve, which action breaks the second shunting circuit at the point of contact of arm 85 and valve 28 and releases the arm 82 from its latch up with the valve and permits it to swing downwardly to its inoperative position under the bias of return spring 84. If the room thermostat happens to be in an open, satisfied condition when this occurs, the valve and plunger, after being moved upwardly, will again immediately fall and the valve will be closed.

From the foregoing, it will be seen that I have provided a solenoid valve and a circuit for the operation thereof, wherein the valve may be manually set in an open position in the absence of electrical energy for its operation and will always be automatically released from this manually set position and restored to normal control at the time the supply of electrical energy is resumed, and that I have accomplished this without the use of additional switching devices.

The foregoing is intended to be illustrative and not limiting, the scope of the invention being set forth in the appended claims.

I claim:

1. In a device of the class described, a valve body, a normally closed valve in said body, an electromagnetic actuator connected to said valve and which when energized opens said valve, a winding for said electromagnetic actuator, a pair of conductors for connecting the ends of said winding across a source of electrical power, means for normally insulating said winding from said valve body, a manual valve operator being normally biased in an operative position and being movable therefrom in a direction to contact said valve and to move it openward, and means forming a third conductive path for connecting one end of said winding to said source of energy, said third conducting path extending through said manual operator and said valve body and being completed by the contact of said manual operator with said valve.

2. In a device of the class described, a valve body, a normally closed valve in said body, a solenoid actuator mounted on said body and including a reciprocating plunger connected to said valve, a winding for said solenoid, means for normally insulating said actuator from said valve body, a manual operator mounted in said valve body, said manual operator having a normally biased inoperative position and being movable in a direction therefrom to contact said valve and to move it openward, a pair of conductor leads for connecting the ends of said solenoid winding across a source of electrical power, and means forming a third conductive path for connecting one end of said winding to said source of electrical power, which path extends through said plunger, said valve, said manual operator and said valve body, and which conductive path is completed when said manual operator is in contact with said valve.

3. In a device of the class described, a valve body, a normally closed valve in said body, a solenoid actuator mounted on said body including a reciprocating plunger connected to said valve, a winding for said solenoid, a pair of conductor leads for connecting the ends of said winding across an electrical power source, a resilient dielectric member between said solenoid actuator and said valve body, a manual valve operator mounted in said body having a normally biased inoperative position and being movable therefrom in a direction to contact said valve and to move it openward, and means forming a third conductive path for connecting one end of said winding to said source of energy and extending through said plunger, said valve, said manual operator and said valve body, and being completed by the contact of said manual operator with said valve.

4. An arrangement as set forth in claim 3 which further includes a current limiting resistor in said third conductive path to minimize the possibility of arcing when contact between said valve and manual operator is broken.

References Cited in the file of this patent

UNITED STATES PATENTS

| | | |
|---|---|---|
| 2,547,098 | Smith | Apr. 3, 1951 |
| 2,622,622 | Ray | Dec. 23, 1952 |
| 2,658,524 | D'Amore | Nov. 10, 1953 |
| 2,712,429 | Ray | July 5, 1955 |